United States Patent [19]
Bahn

[11] Patent Number: 5,214,365
[45] Date of Patent: May 25, 1993

[54] THREE-PHASE RELUCTANCE TYPE ELECTRIC MOTOR

[75] Inventor: Itsuki Bahn, Tokyo, Japan

[73] Assignee: Kabushikigaisha Sekogiken, Tokyo, Japan

[21] Appl. No.: 679,019

[22] PCT Filed: Sep. 17, 1990

[86] PCT No.: PCT/JP90/01188

§ 371 Date: Apr. 30, 1991

§ 102(e) Date: Apr. 30, 1991

[87] PCT Pub. No.: WO91/04602

PCT Pub. Date: Apr. 4, 1991

[30] Foreign Application Priority Data

Sep. 18, 1989 [JP] Japan .................. 1-240184

[51] Int. Cl.$^5$ ........................... H02K 19/10
[52] U.S. Cl. ................... 318/701; 318/254
[58] Field of Search ............ 318/696, 685, 701, 254, 318/138, 439; 310/106

[56] References Cited

U.S. PATENT DOCUMENTS

| | | | |
|---|---|---|---|
| 4,025,859 | 5/1977 | Smith | 318/696 |
| 4,506,207 | 3/1985 | Ferrari | 318/696 |
| 4,647,802 | 3/1987 | Konecny | 310/49 R |
| 4,748,362 | 5/1988 | Hedlund | 310/168 |
| 4,883,999 | 11/1989 | Hendershot | 310/254 |
| 4,998,032 | 3/1991 | Burgbacher | 310/51 |
| 5,043,643 | 8/1991 | Hedlund et al. | 318/254 |

Primary Examiner—Bentsu Ro
Attorney, Agent, or Firm—Staas & Halsey

[57] ABSTRACT

A three-phase reluctance type electric motor wherein a magnetic attraction force acts on a rotor in one direction and is not cancelled, thereby reducing mechanical vibration. Since the number of magnetic poles and salient poles is small, a small electric motor of small output power can be obtained. Reduction in the service life of the motor due to the magnetic attraction force acting on the bearings can be prevented by disposing three motors in the same casing. This causes the magnetic attraction force in a radial direction due to the central motor and the magnetic attraction forces in a radial direction due to the two outer motors to act in opposite directions and thus provides balance and maintains a preset attraction force. Every two of the magnetic poles of each phase define a N and S pole pair and a motor of high output torque and high efficiency can be obtained. A reverse current prevention diode is connected in a forward direction of a DC power source so that stored magnetic energy on an excitation coil can be prevented from being fed back to the DC power source when energization of the excitation coil is interrupted, and so that the magnetic energy is caused to flow into an excitation coil to be next energized. Therefore, the excitation current falls and rises rapidly so that generation of counter torque and reduced torque can be suppressed, thereby providing a motor of high efficiency.

4 Claims, 8 Drawing Sheets

THREE-PHASE RELUCTANCE TYPE ELECTRIC MOTOR

BACKGROUND OF THE INVENTION

1. Field of the Invention

This invention relates to a three-phase reluctance type electrical motor, which is used as a driving source instead of a conventional DC motor and an induction motor having an inverter, and which is used particularly when a motor of a small diameter and small output torque is required or when a narrow and long type motor having a large output power and less vibration is necessary.

2. Description of the Related Art

A reluctance type electric motor is well known in the art and it can provide a large output torque. Although it has been used in a robot arm as a direct driving device for a load, no such a device is available on the market and put into practice since the rotation of speed thereof is extremely low.

The motor is sometimes used as a small stepping motor, but wide application thereof is not yet found.

SUMMARY OF THE INVENTION

As the first subject problem to be solved by this invention, there is a problem that the reluctance type motor generates large amount of mechanical vibration and noise caused by the mechanical vibration. A detailed explanation thereof is made later.

As the second subject problem, there is a problem that, in the reluctance type motor, magnetic flux between magnetic and salient poles for generating rotation torque flows into other magnetic and salient poles to generate counter torque since the salient pole of a rotor and the magnetic pole producing a field are set substantially in a short-circuited state (because a gap between the salient pole and the magnetic pole is small) magnetic path. Therefore, a problem occurs in that the output torque is reduced and the efficiency is lowered.

As a third subject problem, there is a problem that a reluctance type semiconductor motor cannot be formed to have a large number of phases unlike an ordinary commutator motor. This is because the price of the semiconductor circuit on each phase is high and it becomes less practical.

Therefore, stored magnetic energy of each magnetic pole increases and it takes a long time to discharge and store the magnetic energy, and a problem occurs in that high speed cannot be attained although high torque can be attained.

As the fourth subject problem, there is a problem that it is difficult to construct a reluctance type motor of small output power with a small diameter because the number of salient poles becomes larger.

Accordingly, an object of this invention is to provide a small sized three-phase reluctance type electric motor of high speed and high torque in which generation of mechanical vibration and noise can be suppressed in the driving operation.

According to this invention a three-phase reluctance type electric motor of three-phase half-wave energization type comprise a fixed armature having an outer peripheral surface fixed on an outer casing; a rotation shaft rotatably supported by bearings disposed on both sides of the outer casing; a magnetic rotor fixed on the rotation shaft; eight salient poles of the same height formed to project to the outer peripheral surface of the magnetic rotor, having a width of 180 electrical degrees and disposed at a regular pitch; first-phase magnetic poles formed to project from the inner peripheral surface of the fixed armature, having a width of 180 electrical degrees and separated by the same angle, the end portions thereof facing the salient poles with a small gap set therebetween and every two of the first-phase magnetic poles constituting a pair; second- and third-phase magnetic poles having the same construction as the first-phase magnetic poles and disposed to be sequentially separated from the first-phase magnetic poles by 120 mechanical degrees; a position detecting unit for detecting the position of the salient poles of the magnetic rotor by use of position detecting elements to generate a first position detection signal of first-phase rectangular wave and to generate second and third position detection signals of the same waveform and of the second and third phases which are successively generated with a width of 120 electrical degrees; first-, second- and third-phase exciting coils wound on the first-, second- and third-phase magnetic poles; switching elements connected to both ends of the first-, second- and third-phase exciting coils; first diodes respectively connected in a reverse direction to series-connected circuits of the switching elements and corresponding ones of the exciting coils; an energization controlling circuit for setting the switching elements corresponding to the first-, second-and third-phase exciting coils in the conductive state for periods of time corresponding to the widths of the first, second and third position detection signals to energize the corresponding exciting coils using a DC power source, thereby generating a driving torque; means for adjusting the position of the position detecting element and for fixing the same in position on the fixed armature side so as to cause the output torque generated by energization of each phase of the exciting coils to be maximum and flat; and means for rapidly transferring magnetic energy stored in the exciting coil of a preceding stage into stored magnetic energy of the exciting coil of a next stage in a boundary portion between the adjacent position detection signals using a second diode for prevention of reverse current coupled to the DC power source in a forward direction so as to suppress torque reduction due to the rising portion in the initial period of energization of each exciting coil and to suppress generation of counter torque due to the extension of a falling portion in the terminal period thereof.

Further, according to this invention a three-phase reluctance type electric motor characterized by comprises an outer casing having side plates on both sides thereof; a rotation shaft rotatably supported by means of bearings mounted on the central portions of the respective side plates; a magnetic rotor fixed on the rotation shaft; eight salient poles of the same height formed to project to the outer peripheral surface of the magnetic rotor, having a width of 180 electrical degrees and disposed at a regular pitch; first, second and third fixed armatures sequentially arranged in a lateral direction and having outer peripheral portions fixed on the outer casing; first-phase magnetic poles of the first fixed armature formed to project from the inner peripheral surface of the first fixed armature, having a width of 180 electrical degrees and separated by the same angle, the end portions thereof being set to face the salient poles with a small gap disposed therebetween and every two of the first-phase magnetic poles constituting a pair; second-and third-phase magnetic poles of the first fixed armature having the same construction as the first-phase magnetic poles of the first fixed armature and disposed to be sequentially separated from the first-phase magnetic poles of the first fixed armature by 120 mechanical degrees; first-, second- and third-phase magnetic poles of the third fixed armature formed to project from the inner peripheral surface of the third fixed armature, disposed in the position of the same phase as each magnetic pole of the first fixed armature and having the same construction as each magnetic pole of the first fixed armature; first-, second- and third-phase magnetic poles of the second fixed armature formed to project from the inner peripheral surface of the second fixed armature, having the same construction as each magnetic pole of the first fixed armature, disposed to have phases deviated by 180 mechanical degrees and having a width in a direction of the rotation shaft equal to twice that of the magnetic pole of the first fixed armature; a first-, second- and third-phase exciting coils wound on the first-, second- and third-phase magnetic poles of each of the first, second and third fixed armatures; a position detecting unit for detecting the position of the salient poles of the magnetic rotor by use of position detecting elements to generate a first position detection signal of first-phase rectangular wave and to generate second and third position detection signals of the same waveform and of the second and third phases which are successively generated with a width of 120 electrical degrees; switching elements connected to both ends of the first-, second- and third-phase exciting coils; first diodes respectively connected in a reverse direction to series-connected circuits of the switching elements and the corresponding exciting coils; an energization controlling circuit for setting the switching elements corresponding to the first-second- and third-phase exciting coils in the conductive stage for respective periods of time corresponding to the widths of the first, second and third position detection signals to energize the corresponding exciting coil using of a DC power source, thereby generating a driving torque; means for adjusting the position of the position detecting element and for fixing the same in position on the fixed armature side so as to cause the output torque generated by energization of each of phase of the exciting coils to be maximum and flat; means for rapidly transferring magnetic energy stored on the exciting coil of a preceding stage into stored magnetic energy of the exciting coil of a next stage in a boundary portion between the adjacent position detection signals by means of a second diode for prevention of reverse current coupled to the DC power source in a forward direction so as to suppress torque reduction due to the rising portion in the initial period of energization of each exciting coil and to suppress generation of counter torque due to the extension of a falling portion in the terminal period thereof; and means for causing the sum of the magnetic attraction forces in a direction of the diameter between the salient poles and the magnetic poles of the first and third fixed armatures and the attraction force in a direction of the diameter between the salient poles and the magnetic poles of the second armature to act in the opposite directions and maintaining a preset difference therebetween.

According to this invention, an electric motor having a small diameter can be obtained by setting the number of magnetic poles and salient poles less than that of the magnetic poles and salient poles of the conventional motor in a case where the motor is a small output power motor (the output power is equal to or less than 50 Watt). In a case of a large output power motor, a motor is formed to have a narrow and long structure, and the first and fourth subject problems discussed above are solved by using a combination of three motors as in an embodiment shown in FIG. 9.

More specifically, the function of the device of this invention is to suppress generation of mechanical vibration due to the magnetic attraction force acting between the salient poles and the magnetic poles in the diameter direction and having no relation with the output torque.

Generally, general means, means for canceling the above magnetic attraction force is sought to be cancelled by disposing the magnetic poles of the same phase in symmetrical positions with respect to the rotation shaft.

However, since the length of a gap between the magnetic pole and the salient pole is approx. 0.1 to 0.2 mm, the gap length becomes non-uniform in the case of mass production and generation of mechanical vibration cannot be prevented.

The device of this invention is so constructed that the rotor may always receive the magnetic attraction force in a preset direction to suppress mechanical vibration without canceling the magnetic attraction force.

At the same time, since the number of magnetic poles and salient poles is set to be less than that of the conventional case, a small motor of small output power can be constructed is attained by.

In a case of a large output power motor, there occurs a problem that the magnetic attraction force acts on the bearing to reduce the service life thereof.

The above problem can be solved by disposing three three-phase reluctance type motors in the same casing, causing the magnetic attraction force (in the diameter direction) by the central one of the reluctance type motors and the magnetic attraction forces by two reluctance type motors on both sides of the central motor to act in opposite directions so as to set them in balance and maintain preset attraction force.

Every two of the magnetic poles of each phase constitute a pair and the two magnetic poles are excited to become N and S poles so as to solve the second subject problem.

Since the reverse current prevention diode is connected in a forward direction to the application DC power source, the stored magnetic energy on an excitation coil can be prevented from being fed back to the power source side by the above diode when energization of the excitation coil is interrupted and the magnetic energy is caused to flow into an excitation coil to be next energized and stored therein.

Therefore, fall and rise of the excitation current occur rapidly so that generation of counter torque and reduced torque can be suppressed, thereby providing an electric motor of high efficiency.

As a result, the third subject problem can be solved.

For this reason, this invention has the following effect.

Generation of mechanical vibration and noise during the operation can be prevented. Further, in a case of a motor of small output power, the number of salient poles is set to eight, and a small motor of small output power can be obtained.

Further, the rotation speed can be controlled by an application voltage higher than the counter-electromotive force, that is, by a low voltage, and the output torque can be controlled independently by the excitation current so that a reluctance type motor of high speed and large torque can be freely designed the application thereof.

As a result, this invention provides an effective DC motor. In particular, since the rotor is simply formed of a laminated body of silicon steel plates, it can be formed with the narrow and long structure as shown in FIG. 9 and the inertia thereof becomes small.

Further, output torque of not less than that obtained by using a rotor of expensive rare earth magnet can be attained by this invention without using a rotor of such an expensive rare earth magnet.

Since an excitation current which is ineffective with respect to the output torque is interrupted, the efficiency can be enhanced.

Since the rotation speed and output torque can be freely and independently changed, the torque and rotation speed characteristics can be improved.

Next, when the torque is set to be high, particularly in the reluctance type motor, the inductance of the excitation coil becomes large, thereby generating a counter torque and lowering the speed.

In order to solve the above problem and attain the high speed and large torque characteristics, a diode 18 is used to rapidly process the magnetic energy stored in the excitation coil and restrict the excitation current curve within the width of 180 degrees.

DESCRIPTION OF THE PREFERRED EMBODIMENT

There will now be described an embodiment of this invention with reference to the accompanying drawings.

Figure 1:
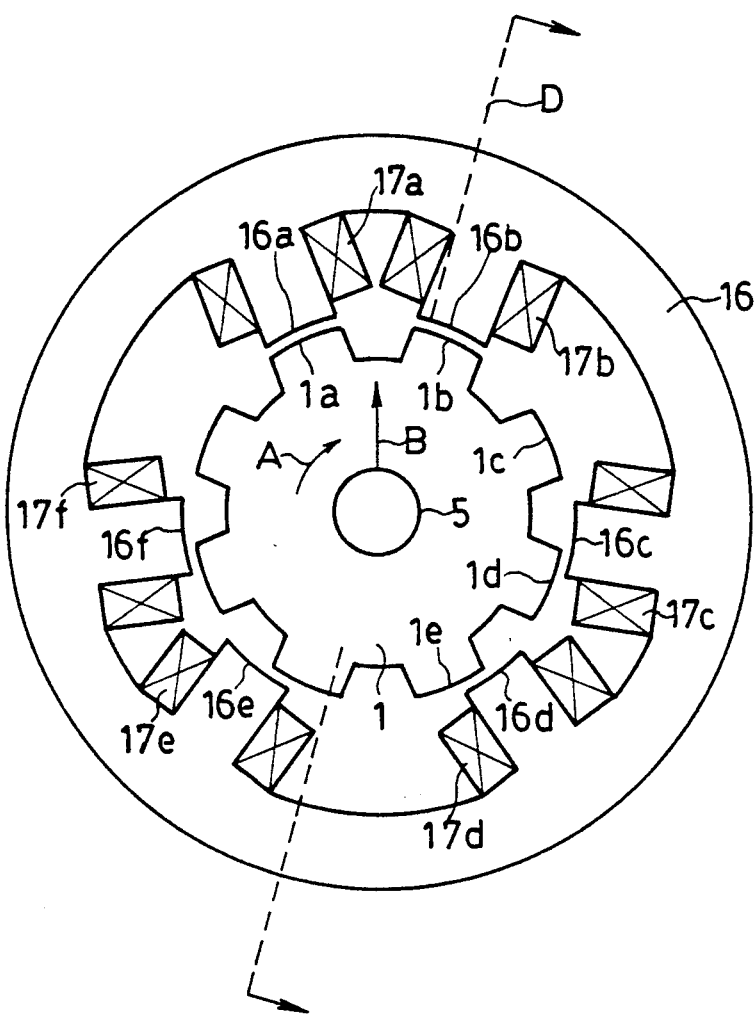
FIG. 1 is an explanatory view of the construction of a three-phase half-wave reluctance type electric motor according to this invention.

FIG. 1 is a plan view showing the construction of exciting coils and magnetic poles of the fixed armature and salient poles of the rotor of a three-phase reluctance type electric motor according to this invention. The angle used hereinafter is indicated by an electrical angle.

The width of salient poles $1a$, $1b$, ... of the rotor is 180 degrees and the salient poles are disposed at the same pitch with a phase difference of 360 degrees. The rotor 1 is constructed in a manner which is known in the art and formed by laminating silicon steel plates, and has a rotation shaft 5.

Magnetic poles $16a$, $16b$, $16c$, $16d$, $16e$ and $16f$ are formed on the fixed armature 16 to project therefrom.

The width of the salient poles $1a$, $1b$, ... and the width of the magnetic poles $16a$, $16b$, $16c$, $16d$, $16e$ and $16f$ are set to the same value of 180 degrees. The number of salient poles is 8 and the number of magnetic poles is 6.

The armature 16 is also constructed in the same manner as the rotor 1.

The magnetic poles $16a$ and $16b$ are separated by 180 degrees, and the magnetic poles $16c$ and $16d$ and the magnetic poles $16e$ and $16f$ are also separated by 180 degrees. The magnetic poles $16a$ and $16b$, the magnetic poles $16e$ and $16f$ and the magnetic poles $16c$ and $16d$ respectively constitute first-, second- and third-phase magnetic poles.

Exciting coils $17a$ and $17b$, exciting coils $17e$ and $17f$ and exciting coils $17c$ and $17d$ which are wound on the respective magnetic poles $16a$, $16b$, $16e$, $16f$, $16c$ and $16d$ constitute first-, second- and third-phase exciting coils.

Figure 2:
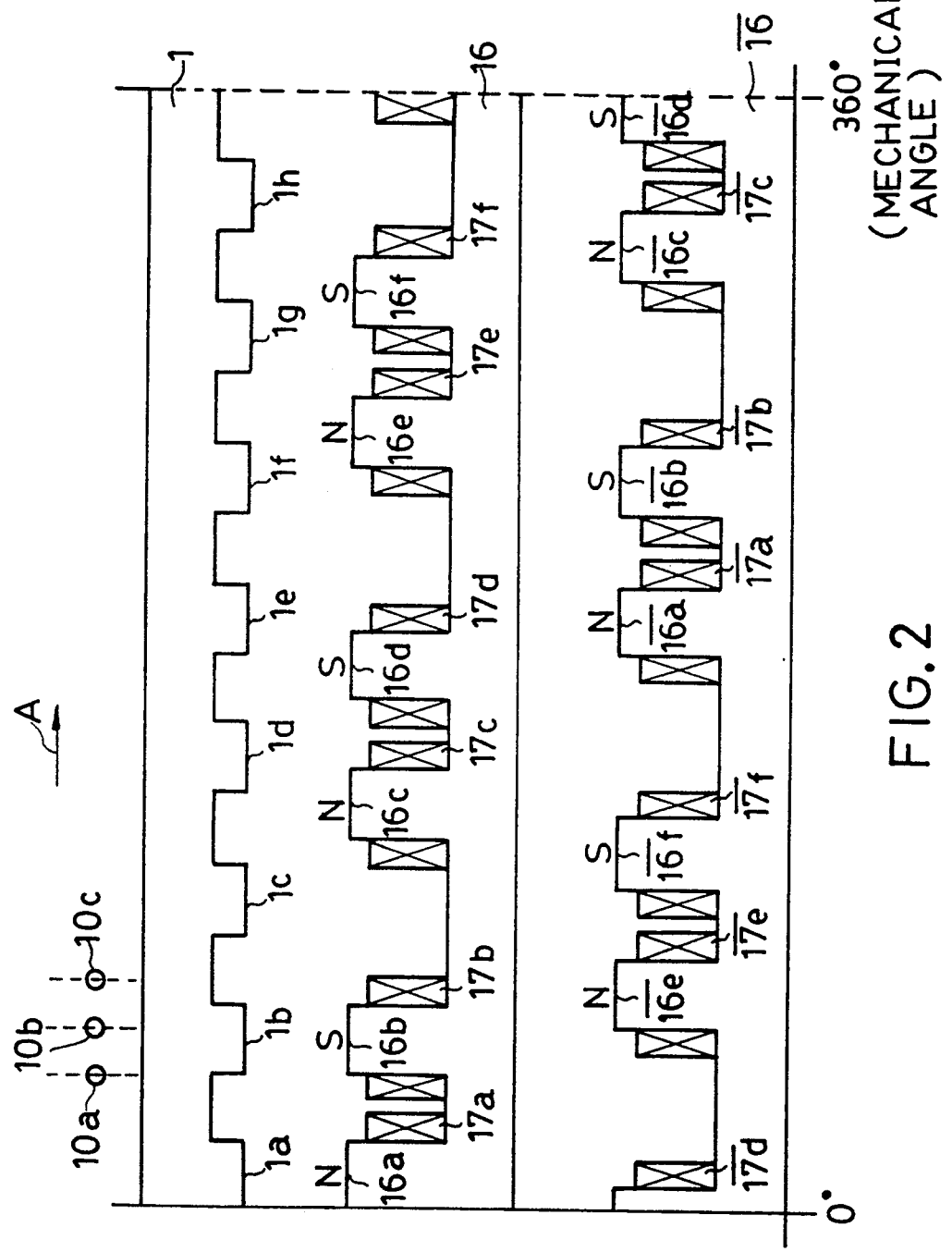
FIG. 2 is a developed view of a rotor, magnetic pole and excitation coil of the above motor.

FIG. 2 is a developed view of the reluctance type three-phase electric motor shown in FIG. 1.

Coils $10a$, $10b$ and $10c$ are position detection elements for detecting the position of the salient poles $1a$, $1b$, ..., and are fixed on the side of the armature 16 in the position shown in the drawing and the planes of the coils are set to face the side surfaces of the salient poles $1a$, $1b$, ... with a gap set therebetween.

The coils $10z$, $10b$ and $10c$ are separated by 120 degrees. The coils is an air-core coil which has a diameter of 5 mm and 100 turns.

Figure 4:
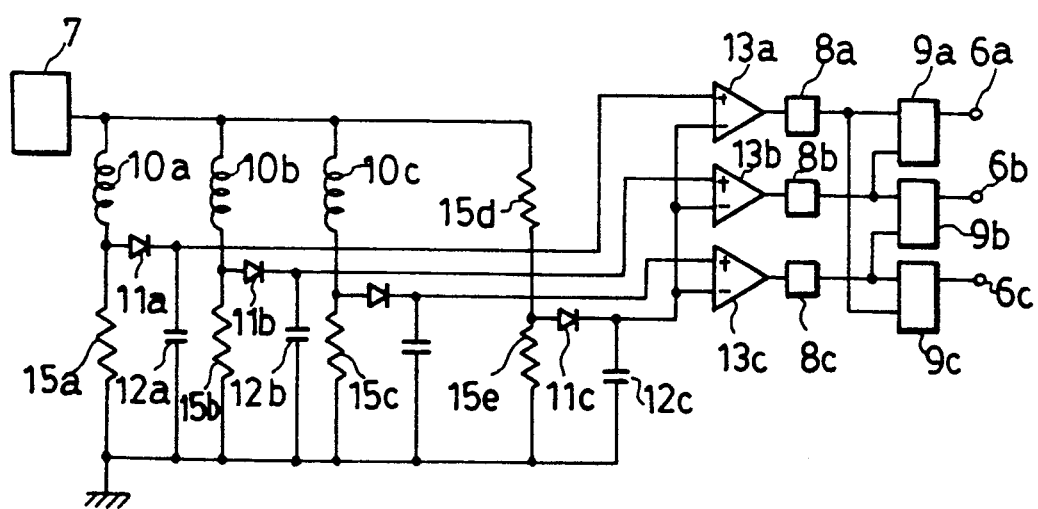
FIG. 4 is a schematic diagram of an electrical circuit for deriving a position detection signal from the coil.

FIG. 4 shows a device for deriving position detection signals by means of the coils $10a$, $10b$ and $10c$.

The coils $10a$, $10b$ and $10c$, and resistors $15a$, $15b$, $15c$, ..., and $15e$ constitute a bridge circuit, and the coils $10a$, $10b$ and $10c$ are adjusted to be set in balance when they do not face the salient poles $1a$, $1b$, ....

Accordingly, outputs of low-pass filters constituted by a diode $11a$ and a capacitor $12a$, and a diode $11c$ and a capacitor $12c$ become equal and an output of an operational amplifier $13a$ is set to a low level.

An oscillation of approx. 1 MHz is effected by an oscillator 7.

When the coil $10a$ comes to face any one of the salient poles $1a$, $1b$, ..., the impedance is reduced by iron loss (eddy current loss and hysteresis loss) and a voltage drop across the resistor $15a$ is increased, thereby setting the output of the operational amplifier $13a$ to a high level.

When the coils $10b$ and $10c$ are set to face the side surfaces of the salient poles $1a$, $1b$, ..., voltage drops across the resistors $15b$ and $15c$ are increased, outputs of high level can be obtained by inputs to + terminals of the operational amplifiers $13b$ and $13c$ via the low-pass filter $11b$, $12b$ and another low-pass filter, respectively.

Figure 8:
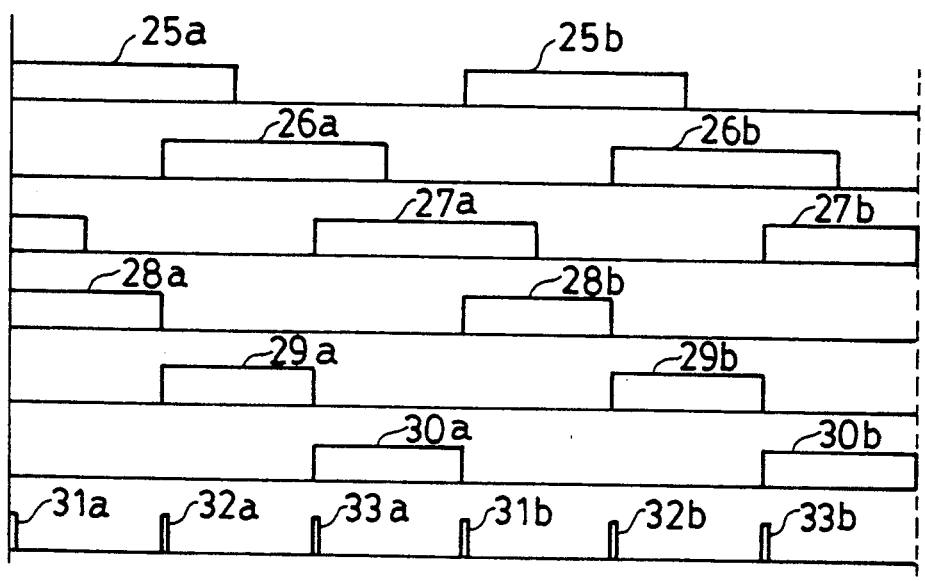

Output signals from the operational amplifiers $13a$, $13b$ and $13c$ are used as position detection signals which are respectively shown by curves $25a$, $25b$, ..., curves $26a$, $26b$, ... and curves $27a$, $27b$, ... in the timing chart of FIG. 8. The above-described three sets of position detection signals are sequentially delayed by 120 degrees.

Outputs of differentiating circuits $8a$, $8b$ and $8c$ shown in FIG. 4 are indicated by electrical signal curves $31a$, $31b$, ..., curves $32a$, $32b$, ... and curves $33a$, $33b$, ... in FIG. 8.

Outputs of terminals $6a$, $6b$ and $6c$ are set to a low level by means of flip-flop circuits $9a$, $9b$ and $9c$ by a reset signal when a power source switch is turned on.

If, at this time, an output of the operational amplifier $13a$ is at a high level, the electrical signal $31a$ can be derived and the output of the terminal $6a$ of the flip-flop circuit $9a$ is set to a high level.

When the motor is rotated and the output of the operational amplifier 13b is set to a high level, the electrical signal 32a (FIG. 8) can be derived and the state of the flip-flop circuit 9a is inverted and the output of the terminal 6a is set to a low level.

At the same time, the flip-flop circuit 9b is energized and the output of the terminal 6b is set to a high level.

Next, when the electrical signal 33a which is a differential pulse of the initial portion of the curve 27a of FIG. 8 is derived, the state of the flip-flop circuit 9b is inverted and the output of the terminal 6b is set to a low level. Further, the flip-flop circuit 9c is also energized and the output of the terminal 6c is set to a high level.

The operation described above is effected and the outputs of the terminals 6a, 6b and 6c are derived as rectangular position detection signals indicated by the curves 28a, 28b, . . . , curves 29a, 29b, . . . and curves 30a, 30b, . . . .

Since the above-described position detection signals are the same as those derived in a Y-connection DC motor which is well known in the art, the signals can also be derived by use of a means which is known in the art and which uses AND circuits.

However, according to the above means, time gap tends to occur between adjacent curves, for example, between the curves 28a and 29a, and triggering torque cannot be obtained in the three-phase half-wave energization, thus presenting a problem.

In the circuit of FIG. 4, the flip-flop circuits 9a, 9b and 9c are used so that the above problem can be solved.

Instead of using the rotor, which the coils 10a, 10b and 10c are disposed to face, an aluminum plate of the same shape may be synchronously rotated and the coils 10a, 10b and 10c may be disposed to face the projecting portions thereof so as to derive position detection signals having the same effect as described above.

The reluctance type motor has an advantage that the output torque can be made extremely large, but it is prevented from being put into practice because of the defects described below.

The first defect is that current cannot be supplied in a reciprocating manner to the exciting coil so that the electric circuit may become expensive and the number of magnetic poles and salient poles increases so that the construction thereof may become complicated.

In a motor according to this invention, a three-phase half-wave motor is used to solve the above problem and at the same time solve problems caused by half-wave energization.

The second defect is that the torque becomes extremely large in an initial period of time in which the salient pole starts to face the magnetic pole and becomes small in the termination period of time. Therefore, the resultant torque may contain a large ripple torque component.

The above problem may be effectively solved by use of the following means.

That is, means for making the widths of the opposed surfaces of the salient pole and the magnetic pole in a direction of the rotation axis different from each other is used.

Figure 7:
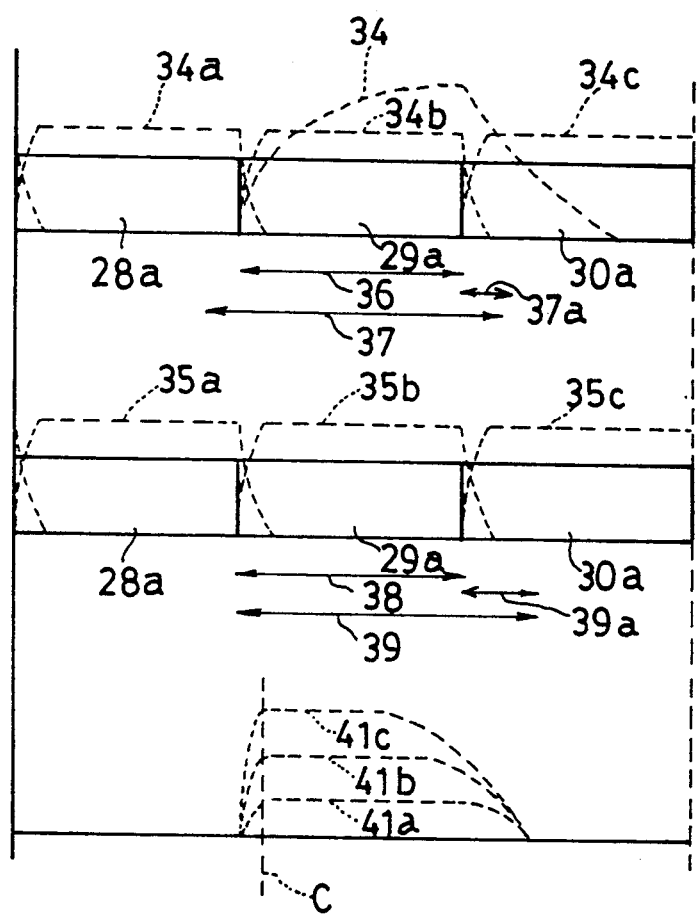
FIGS. 7 and 8 are timing charts of position detection signals, excitation current and output torque.

Leakage flux of the opposite surfaces that may be caused by use of the above means causes the flat portion of the output torque curve to be increased as shown by dashed curves 41a, 41b, . . . in the timing chart of FIG. 7 so that the ripple component of the resultant torque can be reduced. The above means will be described later. Thus, the above problem can be solved.

The third defect is that it is only possible to drive the motor at a low speed. That is, when the torque is increased, the number of salient poles and magnetic poles is increased, and when the exciting current is increased, the rotation speed is significantly lowered and the efficiency becomes low.

In general, in the reluctance type motor, in order to increase the output torque, it is necessary to increase the number of salient poles and magnetic poles of FIG. 1 and reduce the gap between the opposed poles.

At this time, if the rotation speed is kept at a preset value, the inclination of rise of the exciting current is made less steep by magnetic energy stored in the magnetic poles 16a, 16b, . . . and the salient poles 1a, 1b, . . . of FIG. 1. Even after the energization is interrupted, time to terminate the discharge of current is relatively extended by the magnetic energy and therefore large counter torque is generated.

Under this condition, the peak value of the exciting current becomes small and counter torque is generated so that the rotation speed may be set to a small value. Further, the efficiency becomes low.

According to a motor according to this invention, the above defects can be eliminated. This is explained later in detail with reference to the embodiment.

The fourth defect is that vibration occurs during the rotation.

In the developed view of FIGS. 1 and 2, the magnetic core 16 which is an annular portion, and the magnetic poles 16a, 16b, . . . are constructed by laminating and solidifying silicon steel plates by a conventional method and fixed on an outer casing which is not shown to form an armature. The magnetic core 16 provides a magnetic path.

As shown in FIG. 2, the exciting coils 17a, 17b, . . . are mounted on the magnetic poles 16a, 16b, . . . . The exciting coils 17a and 17b are connected in series or in parallel and the connected body form an exciting coil K.

The exciting coils 17c and 17d and the exciting coils 17e and 17f are connected in the same manner to respectively form exciting coils L and M.

When the exciting coil M is energized, the salient poles 1g and 1f are attracted to rotate the rotor 1 in a direction indicated by an arrow A. When it has rotated by 120 degrees, energization of the exciting coil M is interrupted and then the exciting coil L is energized.

When it is further rotated by 120 degrees, energization of the exciting coil L is interrupted and then the exciting coil K is energized.

The energization mode is cyclically changed at each rotation of 120 degrees in a sequence of the exciting coil K, the exciting coil M and the exciting coil L and it is driven as a three-phase half-wave motor.

At this time, magnetic poles of each set which are set in each phase position are magnetized to the N and S poles as shown in the drawing.

Since the two magnetic poles to be magnetized always have different poles, leakage fluxes passing through non-magnetized magnetic poles flow in opposite directions, thereby preventing occurrence of the counter torque.

Next, energization means for the exciting coils K, L and M is explained.

Figure 5:
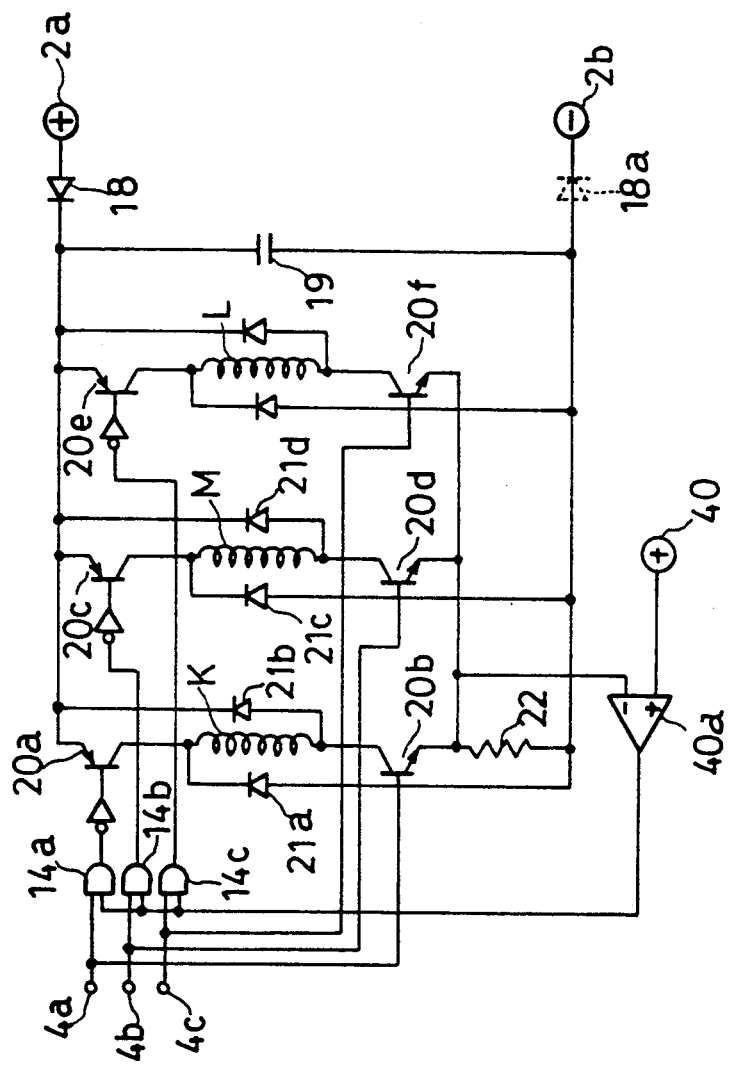
FIGS. 5 and 6 are schematic diagrams of an energization circuit for the excitation coil.

As shown in FIG. 5, transistors 20a, 20b and 20c and transistors 20d, 20e and 20f are respectively connected to both ends of the exciting coils K, L and M.

The transistors 20a, 20b, 20c, ... are used as switching elements, but other semiconductor elements having the same effect can be used.

Electric power is supplied from the positive and negative terminals 2a and 2b of a DC power source.

If an electrical signal of high level is input from the terminal 4a when a lower side input of the AND circuit 14a is at a high, the transistors 20c and 20d and the transistors 20e and 20f are turned on to energize the exciting coils M and L.

A terminal 40 is a reference voltage terminal for specifying the exciting current. It is possible to change the output torque by changing voltage of the terminal 40.

When a power source switch (not shown) is turned on, and input to the − terminal of the operational amplifier 40a is lower than that to the + terminal so that an output of the operational amplifier 40a will be set to a high level, and the transistors 20a, 20b, ..., and 20f, are turned on to apply voltages to the energization circuit of the exciting coils K, M and L.

A resistor 22 is a resistor for detecting exciting currents in the exciting coils K, M and L.

An input signal to the terminal 4a is provided by the position detection signals 28a, 28b, ... of FIG. 8 and input signals to the terminals 4b and 4c are provided by the position detection signals 29a, 29b, ... and 30a, 30b, ...

The above-described curves are indicated by the same symbols in the first column in the timing chart of FIG. 7. The curves 28a, 29a, 30a, ... are continuous.

Next, energization of each exciting coil is explained with reference to the timing chart of FIG. 7.

When the exciting coil M is energized for a period of time corresponding to the width (which is indicated by an arrow 36 and is a width of 120 degrees) of the position detection signal 29a by use of a conventional method, rise of the energization current is delayed as indicated by the front half portion of a dashed curve 34 because the inductance of the exciting coil M is large.

Further, the falling portion thereof is extended by the discharge of large magnetic energy as shown by the latter half portion of the curve 34. A period of time of 180 degrees in which positive torque is generated is indicated by an arrow 37.

Therefore, in the front half portion of the curve 34, the torque is reduced, and in the latter half portion, large counter torque is generated. The fact that the torque is reduced is represented by the expression that the reduced torque is generated. Therefore, the efficiency is lowered and the rotation is effected at a low speed.

One of the features of a motor according to this invention is that the above problem can be solved. This is explained below.

When a position detection signal is input from the terminal 4a, the exciting current increases and the exciting current exceeds a preset value (specified by the reference voltage of the terminal 40 of FIG. 5), an output of the operational amplifier 40a is set to a low level so that an output of the AND circuit 14a may be set to a low level, thereby turning off the transistor 20a.

As a result, when the magnetic energy stored in the exciting coil K is discharged via the diode 21a, the transistor 20b and the resistor 22 and a discharging current has reached a preset value, an output of the operational amplifier 40a is returned to the high level by the hysteresis characteristic thereof so as to turn on the transistor 20a again, thereby increasing the exciting current.

When the exciting current is increased to a preset value defined by the reference voltage 40, an output of the operational amplifier 40a is set to the low level so as to turn off the transistor 20a, thereby reducing the exciting current.

Thus, the circuit functions as a chopper circuit for repeatedly effecting the above operation.

In the end portion of the curve 28a, an input to the terminal 4a of FIG. 5 is eliminated.

As a result, the magnetic energy stored in the exciting coil K tends to be fed back to the positive terminal 2a side of the power source via the diodes 21a and 21b since the transistors 20a and 20b are both set in the OFF state, but it is inhibited by the diode 18.

At this time, since an input signal of high level to the terminal 4b is present, the transistors 20c and 20d are turned on.

Therefore, the stored magnetic energy in the exciting coil K causes a high voltage and flows into the exciting coil M to cause the exciting current to rapidly rise. Further, extinction of the stored magnetic energy can be rapidly effected.

According to the actual measurement, the widths of fall and rise of the exciting current in a motor with an output power of approx. 50 Watt, that is, the widths of fall and rise of the dashed curves 34a and 34b are approximately 15 μsec, and the occurrence of reduced torque and counter torque can be suppressed even in the high-speed rotation (several tens of thousands revolutions per minute).

The widths of falling portion and rising portion of the curves 34a and 34b can be reduced by enhancing the voltage between the terminals 2a and 2b and feeding back the stored magnetic energy to the power source side and thus the same purpose can be attained. However, this requires the application DC voltage ten times higher than that set according to this invention, and thus is less practical.

Occurrence of the counter torque can be prevented by setting the width of the falling portion of the curve 34b of FIG. 7 to be less than 30 degrees (the width indicated by an arrow 37a).

The above conditions are exactly the same for the other energization curves 34b and 34c and the same operation and effect can be attained.

Since the widths of the curves 28a, 29a and 30a become smaller as the rotation speed becomes higher, it is necessary to correspondingly reduce the widths of the falling portion and rising portion of the curves 34a, 34b and 34c.

The current or output torque can be kept constant by the chopper control. In order to increase the output torque, the reference voltage 40 of FIG. 5 may be enhanced.

As described above, a motor according to this invention has a feature wherein a limit to the high-speed rotation is controlled by an application voltage corresponding to a counter-electromotive force, and the output torque can be independently controlled by the reference voltage (specified voltage of the output torque). The control current by the position detection signal 29 (input signal of the terminal 4b) of the exciting coil M varies according to the ON and OFF of the transistor 20c as shown by broken lines 34b of FIG. 7 by the chopper effect of the AND circuit 14b and the operational amplifier 40a of FIG. 5 and then rapidly falls as shown by the broken lines at the end of the curve 29a.

When the position detection signal 30a is next input to the terminal 4c of FIG. 5, energization of the exciting coil L is effected in the same manner.

As described above, the exciting coils K, M and L are sequentially and continuously energized to generate output torque.

As described before, since there is no gap in the boundary portion between the signal curves 28a, 29a, . . . of FIG. 7, and one of the exciting coils is energized at startup. Therefore, the starting operation can be reliably effected.

The diode 18 of FIG. 5 is connected to the positive terminal 2a side of the power source, but it is possible to attain the same object by omitting the diode and connecting a reverse current prevention diode 18a (indicated by broken lines) to the negative terminal 2b side of the power source.

A capacitor 19 is not always necessary but is used to prevent the transistors 20a, 20b, . . . from being damaged when the ON and OFF operations of the transistors are delayed. In order to attain the above purpose, the capacitance of the capacitor 19 may be set to 0.1 $\mu$F.

At the time of low-speed operation of approximately 3000 revolutions per minute, it is not necessary to make the rise and fall of the curves 34a, 34b and 34c of FIG. 7 steep so that the capacitance of the capacitor 19 may be increased according to the rotation speed.

The chopper control attained by the ON and OFF operations of the transistors 20a, 20c and 20e has been explained above, but the object of this invention can be attained by using a chopper circuit for controlling the ON and OFF operations of the transistors 20a and 20b, transistors 20c and 20d, and transistors 20e and 20f according to outputs of the AND circuits 14a, 14b and 14c, respectively.

Next, the control operation is explained in detail with reference to FIG. 6.

Figure 6:
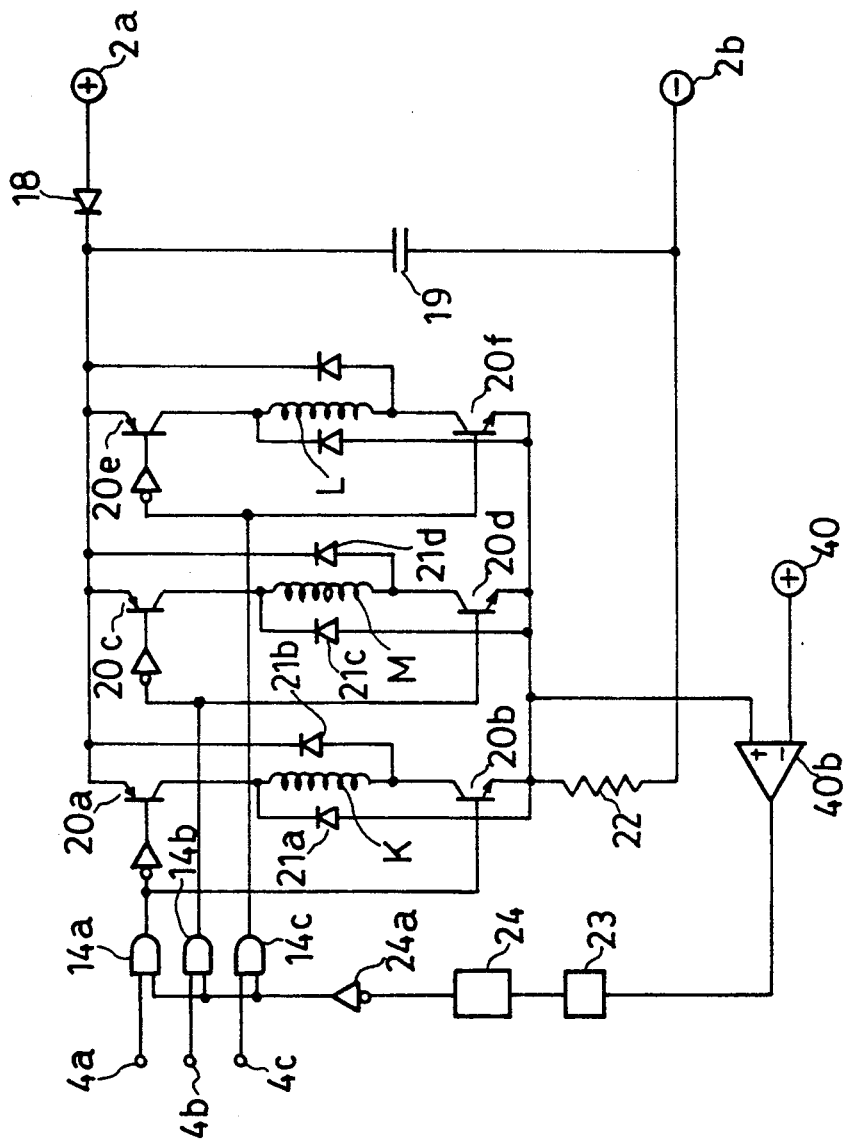

The circuit of FIG. 6 is different from the embodiment of FIG. 5 in the chopper circuit. When a voltage drop occurs across the resistor 22, current in the exciting coil K is small and an input to the + terminal of an operational amplifier 40b is smaller than an input (voltage at the reference voltage terminal 40) to the — terminal thereof, the output thereof is set to a low level.

Therefore, an output of an inverter circuit 24a is set to a high level, and when input of a position detection signal to the terminal 4a is started, an output of an AND circuit 14a is set to a high level to turn on transistors 20a and 20b, thereby increasing current in the exciting coil K.

When the exciting current has exceeded a preset value, an output of the operational amplifier 40b is changed to a high level, and therefore, a differential pulse can be derived from a differentiating circuit 23 and the differential pulse energizes a monostable circuit 24 so as to generate an electrical signal of high level of preset time length. The electrical signal is inverted by the inverter circuit 24a.

As a result, an output of the AND circuit 14a is changed to a low level for a preset period of time and the transistors 20a and 20b are turned off.

Magnetic energy stored in the exciting coil K is not fed back to the power source because of the presence of a diode 18 and charges a capacitor 19.

As described before, since the capacitance of the capacitor 19 is set to approx. 0.1 $\mu$F, the charging operation will be completed in 15 $\mu$sec even when the entire magnetic energy stored in the exciting coil K is discharged and charged. Therefore, the exciting current will rapidly fall even in this case although the situation is slightly different.

In a case where the length of time for the exciting current to fall by 1/100 is 2 $\mu$sec, the transistors 20a and 20b can be turned on again to increase the current in the exciting coil K when the exciting current is reduced by 1/100 by setting the time length of the output of the monostable circuit 24 to 2 $\mu$sec.

Since an application voltage set at this time becomes equal to the high voltage of the capacitor 19, the exciting current rapidly rises, and when it has exceeded a preset value specified by the voltage of the reference voltage terminal 40, the transistors 20a and 20b are turned off again for the time length of the output of the monostable circuit 24. When the exciting current decreases by 1/100, the exciting current increases.

The circuit constitutes a chopper circuit for repeatedly effecting the above operation.

The same chopper operation is effected for the other exciting coils M and L. The circuit has a feature wherein the chopper frequency can be set higher than that set in the case of the chopper circuit of FIG. 5.

Therefore, a current ripple caused by the chopper circuit or an output torque ripple can be reduced.

Further, the chopper frequency can be reduced by increasing the capacitance of the capacitor 19 and increasing the output width of the monostable circuit 24.

As is clearly understood from the above explanation for the embodiments of FIGS. 5 and 6, since the number of salient poles and magnetic poles is small, an electric motor of small output power having a small diameter can be obtained.

An electric motor of high speed and high efficiency can be obtained by using the diode 18.

In FIG. 1, the magnetic poles 16a and 16b attract the salient poles 1a and 1b in a direction indicated by an arrow B (in a diameter direction) when the exciting coils 17a and 17b are energized, and then the exciting coils 17e and 17f are next energized so that the arrow B of attraction force is rotated by 120 mechanical degrees in a counterclockwise direction.

As described above, the attraction force of arrow B is rotated in the opposite direction with respect to the rotation of the rotor 1 in the direction of arrow A, and the rotation shaft 5 is kept pushed against the bearings (ball bearings of the shaft 5). Thus, vibration can be suppressed.

As is understood from the above explanation, the defects described before can be solved.

The torque curve (created by the N and S magnetic poles) of a DC motor having a magnet rotor is symmetrical, but the torque curve of a reluctance type motor is asymmetrical, and the torque becomes extremely large in the initial period in which the salient poles start to face the magnetic pole and rapidly decreases in the termination period.

The torque curve may have a flat portion as shown by the curves 41a, 41b, . . . in FIG. 7 by setting the widths of the magnetic poles in the direction of the rotation axis to different values.

However, as is seen from the curves 41a, 41b, . . . , increase in the exciting current.

Therefore, the output torque can be increased and the flatness of the output torque characteristic can be improved by setting the starting point of energization earlier than the energization (in the case described before) of 120 degrees in the central portion of the torque curve.

This is explained below with reference to the third-stage timing chart of FIG. 7.

The torque is made flat on the right side of a point indicated by broken lines C, and the width of the flat portion thereof becomes smaller as the exciting current increases.

The exciting coil M is explained as an example. The fixed positions of the coils 10a, 10b and 10c of FIG. 2 are adjusted so that energization can be started near the starting portion of the third-stage torque curve of the timing chart.

Therefore, the exciting current may be indicated by a dashed curve 35b. An arrow 38 indicates the width of the curve 29a which is 120 degrees, and an arrow 39 indicates the width of 180 degrees in which the positive torque can be obtained.

If the width of the falling portion of the curve 35b is smaller than the arrow 39a, no counter torque is generated. The width is set to be twice that of the arrow 37a in the first stage, and therefore a motor of higher speed can be obtained.

Further, since the length of the flat portion of the output torque is increased, the output torque ripple can be reduced.

The exciting currents in the other exciting coils K and L indicated by dashed curves 35a and 35c and the effects thereof which are the same as described above can be obtained.

The length of the flat portion of the torque curves 41a, 41b, ... becomes smaller as the exciting current is larger, that is, the curve is positioned in the higher position, and it is necessary to increase the length of the flat portion of the torque by changing the shape of the salient poles facing the magnetic poles.

As described before with reference to the arrow B of FIG. 1, occurrence of vibration can be prevented.

However, in the case of a motor having a large output power, since the ampere-turn of the exciting coil is large, the attraction force of the arrow B becomes large, thereby presenting a problem in that the service life of the ball bearing is reduced.

Figure 9:
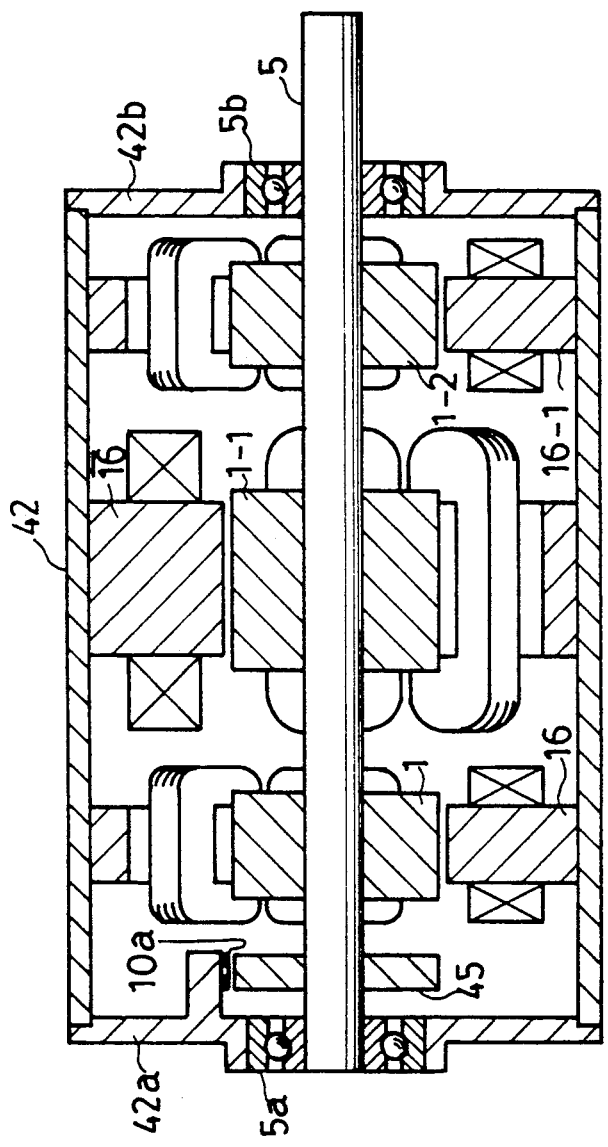
FIG. 9 is a cross sectional view of another embodiment of a device according to this invention.

An embodiment in which the above problem is solved is shown in FIG. 9.

Side plates 42a and 42b are fitted to openings of a metal cylinder 42, and a rotation shaft 5 is rotatably supported by ball bearings 5b and 5a mounted to the side plates 42b and 42a, respectively.

The central portions of rotors 1, 1-1 and 1-2 are fixed on the rotation shaft 5. The rotor 1 is shown by the same symbol in the developed view of FIG. 2.

The rotors 1-1 and 1-2 have salient poles having the same construction as those of the rotor 1 and the salient poles are arranged in the same phase position. The rotors 1, 1-1 and 1-2 can be integrally formed.

Armatures 16 and 16 are the armature shown in FIG. 2.

An armature 16-1 has the same construction as the armature 16.

The outer peripheral portion of each of the armatures is forcedly inserted into and fixed inside an outer casing 42. First-, second- and third-phase magnetic poles of the armatures 16 and 16-1 are set in positions of the same phase.

The detail of the armature $\overline{16}$ is shown in FIG. 2.

First-, second- and third-phase magnetic poles $\overline{16a}$ and 16b, magnetic poles $\overline{16e}$ and $\overline{16f}$, and magnetic poles $\overline{16c}$ and $\overline{16d}$ corresponding to the magnetic poles 16a, 16b, ... are arranged with deviation of 180 mechanical degrees in the right direction.

Projecting portions of the same shape and same phase as the salient poles 1a, 1b, ... are formed on the outer periphery of the position detection rotor 45 formed of an aluminum plate, position detection coils 10a, 10b and 10c are arranged to face the outer peripheral surface thereof, and position detection signals can be derived by use of the circuit shown in FIG. 4.

The rotor 1-1 of FIG. 9 having the same construction as the rotor 1 can be driven in a direction indicated by the arrow A (shown in FIG. 2) by the above position detection signal and controlling energization of exciting coils $\overline{17a}$ and $\overline{17b}$, exciting coils $\overline{17e}$ and $\overline{17f}$, and exciting coils $\overline{17c}$ and $\overline{17d}$ used instead of the exciting coils K, M and L by use of the energization controlling circuit of FIG. 6.

The armature 16-1 of FIG. 9 has the same construction as the armature 16, and the rotor 1-2 can be driven in a direction of the arrow A by energizing the exciting coils of the magnetic poles thereof by use of the energization controlling circuits of FIGS. 5 and 6.

As a result, the motor 9 can be driven as three three-phase half-wave energization type motors.

Forces in the direction of the arrow B (shown in FIG. 1) in which the rotors 1 and 1-2 are attracted in the diameter direction by the magnetic poles of the armatures 16 and 16-1 act in the same direction.

The vector of force by which the rotor 1-1 is attracted in the diameter direction by the magnetic poles of the armature $\overline{16}$ is set in a direction opposite to that indicated by the arrow B.

As shown in FIG. 9, a difference between the two vectors in the diameter direction described above can be set to a small value by setting the widths of the rotors 1 and 1-2 in the direction of the rotation axis equal to each other and setting the sum of the above widths substantially equal to the width of the rotor 1-1.

Therefore, the force by which the rotation shaft 5 depresses the ball bearings 5a and 5b can be reduced. Consequently, bearing damage in a motor of large output power can be eliminated and an vibration is prevented.

Figure 3:
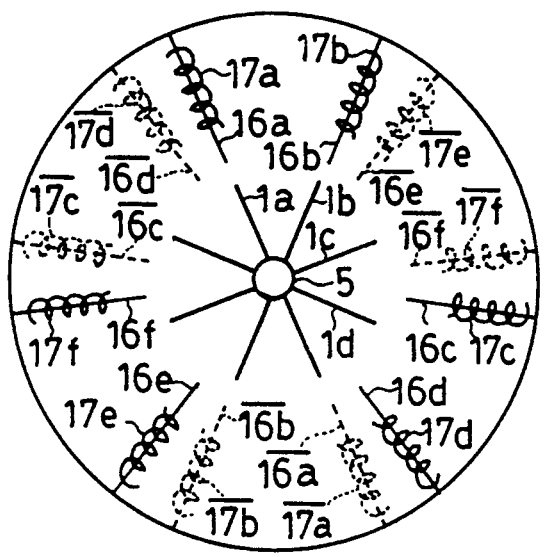
FIG. 3 is an explanatory view of the arrangement of a magnetic pole, excitation coil and salient pole of the motor of FIG. 9.

FIG. 3 shows the arrangement of the magnetic poles and exciting coils as viewed in the direction of the rotation shaft 5.

The positions of the salient poles 1a, 1b, ... are shown, the magnetic poles 16a, 16g, ... and 16f indicate the position of the armature of FIG. 9. The magnetic poles of the armature 16-1 are also set in the same position with the same phase.

The magnetic poles $\overline{16a}$, $\overline{16b}$, ..., and $\overline{16f}$ of the armature $\overline{16}$ are set in positions deviated by 180 mechanical degrees.

The cross section of FIG. 1 taken along the arrow D is shown in FIG. 9.

A motor according to this invention is used as a driving source instead of an induction motor having an inverter and a DC motor, and is particularly used in a case where the diameter is small and the output torque is small, or where a motor which is narrow and long, whose output power is large and in which vibration suppression is required.

I claim:

1. A three-phase reluctance electric motor, comprising:
   a fixed armature having an outer peripheral surface fixed on an outer casing;
   a rotation shaft rotatably supported by bearings disposed on both sides of said outer casing;
   a magnetic rotor fixed on the rotation shaft;
   eight salient poles of the same height formed to project to an outer peripheral surface of said magnetic rotor, having a width of 180 electrical degrees and disposed at a predetermined pitch;
   first-phase magnetic poles formed to project from an inner peripheral surface of said fixed armature, having a width of 180 electrical degrees and separated by 180 electrical degrees, having end portions facing said salient poles with a predetermined gap between said end portions and said salient poles, and two of said first-phase magnetic poles defining a pair;
   second- and third-phase magnetic poles having the same construction as said first-phase magnetic poles and disposed to be sequentially separated from said first-phase magnetic poles by 120 mechanical degrees;
   a position detecting means for detecting a position of said salient poles of said magnetic rotor, said position detecting means including position detecting element means for generating a first position detecting signal of a first-phase rectangular wave and second and third position detecting signals of second-and third-phase rectangular waves, said first, second and third position detecting signals being successively generated with a width of 120 electrical degrees;
   first-, second- and third-phase exciting coils wound on said first-, second- and third-phase magnetic poles;
   switching elements connected to both ends of said first-, second- and third-phase exciting coils;
   first diodes respectively connected in a reverse direction to series-connected circuits of said switching elements and corresponding ones of said first-, second- and third-phase exciting coils;
   an energization controlling circuit means for setting said switching elements corresponding to said first-, second- and third-phase exciting coils in a conductive state for respective periods of time corresponding to the widths of said first, second and third position detecting signals to energize said corresponding ones of said first-, second- and third-phase exciting coils, said energization controlling circuit means including DC power source means for generating a driving torque;
   means for adjusting the position of said position detecting means and for fixing the position of said position detecting means so as to cause an output torque generated by energization of each of the first-, second- and third-phase exciting coils to be substantially at a maximum and substantially flat; and
   transfer means for rapidly transferring magnetic energy stored on a preceding one of said first-, second- and third-phase exciting coils into stored magnetic energy of a next one of said first-, second- and third-phase exciting coils in a boundary portion between adjacent ones of said first, second and third position detecting signals, said transfer means including second diode means for preventing a reverse current and coupled to said DC power source means in a forward direction so as to suppress torque reduction due to a rising portion in an initial period of energization of each of said first-, second- and third-phase exciting coils and to suppress generation of a counter torque due to an extension of a falling portion in the terminal period of each of said first, second- and third-phase exciting coils.

2. A three-phase reluctance electric motor, comprising:
   an outer casing having side plates on both sides of said outer casing;
   a rotation shaft rotatably supported by bearings mounted on central portions of said side plates;
   a magnetic rotor fixed on said rotation shaft;
   eight salient poles of the same height formed to project to an outer peripheral surface of said magnetic rotor, having a width of 180 electrical degrees and disposed at a predetermined pitch;
   first, second and third fixed armatures sequentially arranged in an axial direction and having outer peripheral portions fixed on said outer casing;
   first-phase magnetic poles of said first fixed armature formed to project from an inner peripheral surface of said first fixed armature, having a width of 180 electrical degrees and separated by 180 electrical degrees, having end portions facing said salient poles with a predetermined gap between said end portions and said salient poles, and two of said first-phase magnetic poles of said first fixed armature defining a pair;
   second- and third-phase magnetic poles of said first fixed armature having the same construction as said first-phase magnetic poles of said first fixed armature and disposed to be sequentially separated from said first-phase magnetic poles of said first fixed armature by 120 mechanical degrees;
   first-, second- and third-phase magnetic poles of said third fixed armature formed to project from an inner peripheral surface of said third fixed armature, each of said first-, second- and third-phase magnetic poles of said third fixed armature being disposed in a position corresponding to corresponding ones of said first-, second- and third-phase magnetic poles of said first fixed armature and having the same construction as corresponding ones of said first-, second- and third-phase magnetic poles of said first fixed armature;
   first-, second- and third-phase magnetic poles of said second fixed armature formed to project from an inner peripheral surface of said second fixed armature, each of said first-, second- and third-phase magnetic poles of said second fixed armature having the same construction as corresponding ones of said first-, second- and third-phase magnetic poles of said first fixed armature, disposed in a position deviated by 180 mechanical degrees from corresponding ones of said first-, second- and third-phase magnetic poles of said first fixed armature and having a width in the axial direction equal to twice that of corresponding ones of said first-, second- and third-phase magnetic poles of said first fixed armature;
   first-, second- and third-phase exciting coils wound on said first-, second- and third-phase magnetic poles of each of said first, second and third fixed armatures;

a position detecting means for detecting a position of said salient poles of said magnetic rotor, said position detecting means including position detecting element means for generating a first position detecting signal of a first-phase rectangular wave and second and third position detecting signals of second-and third-phase rectangular waves, said first, second and third position detecting signals being successively generated with a width of 120 electrical degrees;

switching elements connected to both ends of said first-, second- and third-phase exciting coils;

first diodes respectively connected in a reverse direction to series-connected circuits of said switching elements and corresponding ones of said first-, second- and third-phase exciting coils;

an energization controlling circuit means for setting said switching elements corresponding to said first-, second- and third-phase exciting coils for periods of time corresponding to the widths of the first, second and third position detecting signals to energize said corresponding ones of said first-, second- and third-phase exciting coils, said energization controlling circuit means including DC power source means for generating a driving torque;

means for adjusting the position of said position detecting means and for fixing the position of said position detecting means so as to cause an output torque generated by energization of each of said first-, second- and third-phase exciting coils to be substantially at a maximum and substantially flat;

transfer means for rapidly transferring magnetic energy stored on a preceding one of said first-, second- and third-phase exciting coils into stored magnetic energy of a next one of said first-, second- and third-phase exciting coils in a boundary portion between adjacent ones of said first, second and third position detecting signals, said transfer means including second diode means for preventing a reverse current and coupled to said DC power source means in a forward direction so as to suppress torque reduction due to a rising portion in an initial period of energization of each of said first-, second- and third-phase exciting coils and to suppress generation of a counter torque due to an extension of a falling portion in the terminal period of each of said first-, second- and third-phase exciting coils; and means for causing the sum of magnetic attraction forces in a radial direction between said salient poles and said first-, second- and third-phase magnetic poles of said first and third fixed armatures and a magnetic attraction force in a radial direction between said salient poles and said first-, second- and third-phase magnetic poles of said second fixed armature to act in opposite directions and for maintaining a preset difference therebetween.

3. A three-phase reluctance electric motor, comprising:

an outer casing;

a rotation shaft rotatably supported by said other casing;

a magnetic rotor fixed on said rotation shaft;

salient poles projecting to an outer peripheral surface of said magnetic rotor, said salient poles being disposed at a regular pitch;

first, second and third fixed armatures sequentially arranged in an axial direction and being fixed to said outer casing;

a pair of first-phase magnetic poles of said first fixed armature projecting from an inner peripheral surface of said first fixed armature, each of said first-phase magnetic poles of said first fixed armature being adjacent to the other and having an end portion facing one of said salient poles with a predetermined gap between said end portion and said one of said salient poles;

a pair of second-phase magnetic poles of said first fixed armature projecting from the inner peripheral surface of said first fixed armature, each of said second-phase magnetic poles of said first fixed armature being adjacent to the other and being separated from a corresponding one of said first-phase magnetic poles of said first fixed armature by 120 mechanical degrees;

a pair of third-phase magnetic poles of said first fixed armature projecting from the inner peripheral surface of said first fixed armature, each of said third-phase magnetic poles of said first fixed armature being adjacent to the other and being separated from a corresponding one of said first- and second-phase magnetic poles of said first fixed armature by 120 mechanical degrees;

first-, second- and third-phase magnetic poles of said third fixed armature projecting from an inner peripheral surface of said third fixed armature, each of said first-, second- and third-phase magnetic poles of said third fixed armature being in a position corresponding to corresponding ones of said first-, second- and third-phase magnetic poles of said first fixed armature and having the same construction as corresponding ones of said first-, second- and third-phase magnetic poles of said first fixed armature;

first-, second- and third-phase magnetic poles of said second fixed armature projecting from an inner peripheral surface of said second fixed armature, each of said first-, second- and third-phase magnetic poles of said second fixed armature having the same construction as corresponding ones of said first-, second- and third-phase magnetic poles of said first fixed armature and being disposed in a position deviated by 180 mechanical degrees from corresponding ones of said first-, second- and third-phase magnetic poles of said first fixed armature.

4. A three-phase reluctance electric motor as recited in claim 3, wherein:

each of said first-, second- and third-phase magnetic poles of said second fixed armature having a width in the axial direction equal to twice that of corresponding ones of said first-, second- and third-phase magnetic poles of said first fixed armature.

* * * * *